(12) United States Patent
Mathur et al.

(10) Patent No.: US 9,512,307 B2
(45) Date of Patent: Dec. 6, 2016

(54) POLYMER COMPOSITION AND A PROCESS FOR PREPARING THE SAME

(71) Applicant: Reliance Industries Limited, Mumbai (IN)

(72) Inventors: Ajit Behari Mathur, Vadodara (IN); Satya Srinivasa Rao Gandham, Vadodara (IN); Uma Sankar Satpathy, Vadodara (IN); Krishna Renganath Sarma, Vadodara (IN); Vijay Shivaji Kadam, Maharashtra (IN); Raksh Vir Jasra, Vadodara (IN)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 14/433,564

(22) PCT Filed: Oct. 4, 2013

(86) PCT No.: PCT/IN2013/000604
§ 371 (c)(1),
(2) Date: Apr. 3, 2015

(87) PCT Pub. No.: WO2014/054055
PCT Pub. Date: Apr. 10, 2014

(65) Prior Publication Data
US 2015/0225555 A1 Aug. 13, 2015

(30) Foreign Application Priority Data
Oct. 5, 2012 (IN) .......................... 2930/MUM/2012

(51) Int. Cl.
*C08L 23/00* (2006.01)
*C08L 23/06* (2006.01)
*C08L 23/08* (2006.01)

(52) U.S. Cl.
CPC ............ *C08L 23/06* (2013.01); *C08L 23/0815* (2013.01); *C08L 2205/025* (2013.01); *C08L 2207/062* (2013.01); *C08L 2207/068* (2013.01)

(58) Field of Classification Search
CPC ............... C08L 23/06; C08L 23/0815; C08L 2205/025; C08L 2207/06
See application file for complete search history.

(56) References Cited

U.S. PATENT DOCUMENTS

2009/0087749 A1* 4/2009 Takita et al. ............ C08L 23/04
429/249
2010/0178503 A1 7/2010 Tam et al.
2011/0275764 A1 11/2011 Ellul et al.
2012/0004358 A1 1/2012 Tam et al.

FOREIGN PATENT DOCUMENTS

| CN | 102167860 A | 8/2011 |
| WO | 94/28064 A1 | 12/1994 |
| WO | 2011/124650 A1 | 10/2011 |

OTHER PUBLICATIONS https://en.wikipedia.org/wiki/Bulk_density, taken from the World Wide Web on Dec. 14, 2015, as evidence, only.*
International Search Report issued in PCT/IN2013/000604, mailed Apr. 18, 2014 (2 pages).

* cited by examiner

*Primary Examiner* — Nathan M Nutter
(74) *Attorney, Agent, or Firm* — Osha • Liang LLP

(57) ABSTRACT

A polymer composition has homogenous dispersion of a first polymer with a second polymer. The first polymer includes but is not limited to ethylene based homopolymer and ethylene based copolymer. The second polymer has molecular weight higher than the molecular weight of the first polymer and heat of fusion greater than 200 J/g.

Figure 1:
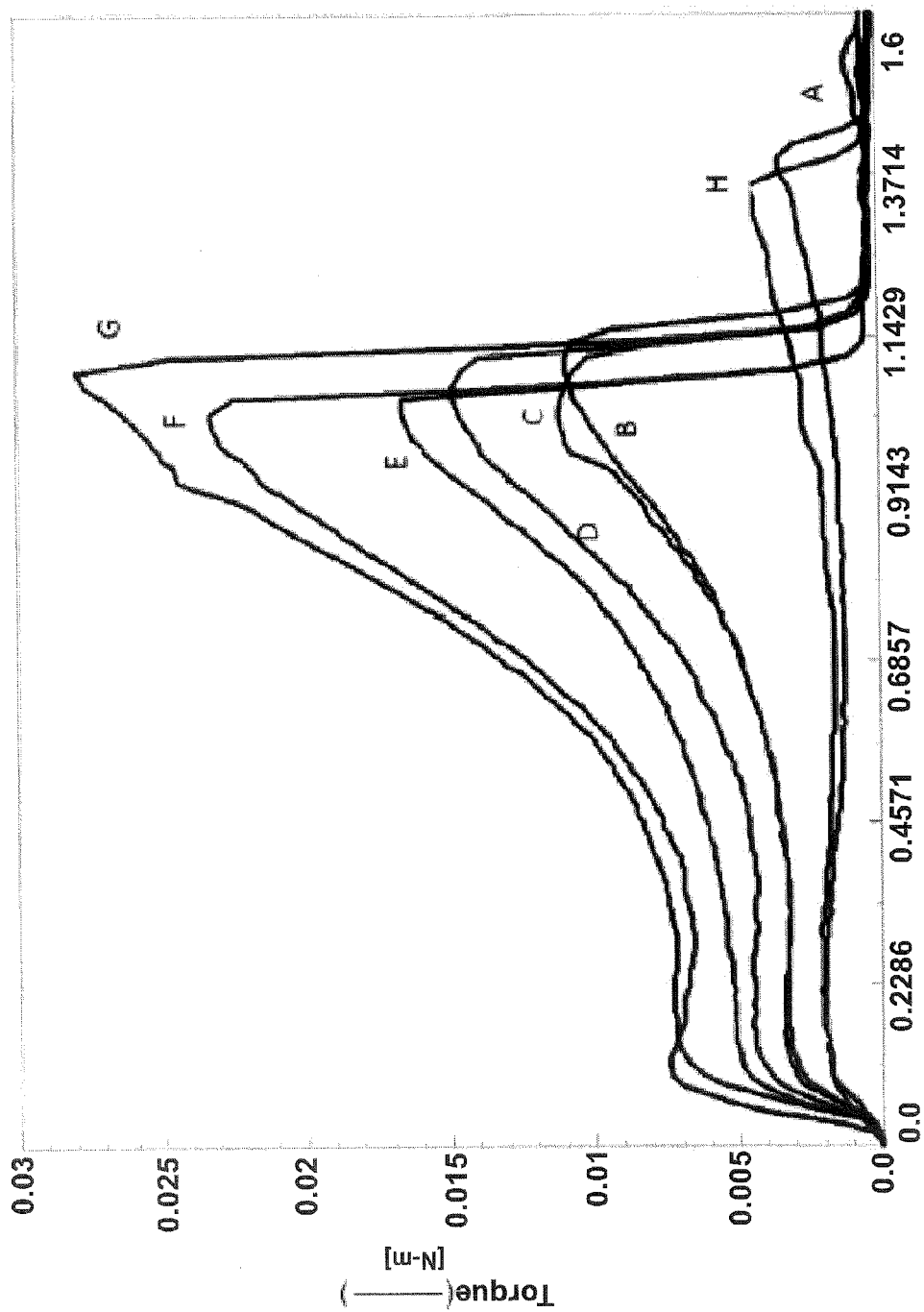

14 Claims, 7 Drawing Sheets a b c

POLYMER COMPOSITION AND A PROCESS FOR PREPARING THE SAME

FIELD OF DISCLOSURE

The present disclosure relates to a polymer composition and a process for preparing the same.

The present disclosure particularly relates to a polymer composition having superior properties such as creep resistance, environmental stress crack resistance, stress bearing capability, stiffness and ductility than the individual component of the composition.

DEFINITIONS

As used in the present disclosure, the following words and phrases are generally intended to have the meaning as set forth below, except to the extent that the context in which they are used to indicate otherwise.

The term "Disentangled Ultrahigh Molecular Weight Polyethylene" (DUHMWPE) used in the context of the present disclosure refers to homo-polymers or copolymers of ethylene having disentangled polymer chains. DUHMWPE is characterized by molecular weight ranging between $3 \times 10^5$ g/mole and $20 \times 10^6$ g/mole, bulk density less than 0.30 g/cc and heat of fusion greater than 200 j/g.

The term "Regular Ultrahigh Molecular Weight Polyethylene" (Regular UHMWPE) used in the context of the present disclosure refers to homo-polymers or copolymers of ethylene having intertwined or entangled polymer chains. Regular UHMWPE is characterized by molecular weight ranging between $3 \times 10^5$ and $20 \times 10^6$ mole, bulk density greater than 0.30 g/cc and heat of fusion less than 175 j/g.

The term 'Tie chain' used in the context of the present disclosure refers to polymer chains that participate in the formation of amorphous and crystalline regions and thereby work as tie chain in the polymer matrix.

The term 'Environmental stress cracking' used in the context of the present disclosure refers to an external or internal crack in a polymer caused by applied stresses, less than its short-term mechanical strength, under accelerated environmental conditions. The term 'Environmental stress cracking' used in the context of the present disclosure includes but is not limited to brittle fracture, multiple cracks, creep rupture and stretched fibrils.

The torque vs. time curve recorded for the polymer and the composition of the present disclosure represents their extensional stress strain behavior. The test specimen in the form of thin sheet is tested at the temperature of 123 to 128° C. employing contra-rotating roller assembly to obtain the data. The slope of the initial linear portion of the curve indicates the sample's stiffness, deviation from the linearity "yield", area under the curve "stiffness" and torque at break the highest stress bearing ability. The time on X axis indicates strain. The high strain associated with high stress bearing ability indicates failure under ductile mode after high resistance to applied load.

ACRONYMS

1. Disentangled Ultrahigh Molecular Weight Polyethylene: DUHMWPE
2. Regular Ultrahigh Molecular Weight Polyethylene: Regular UHMWPE
3. Environmental Stress Cracking: ESC
4. Polarizing Microscope: POM

BACKGROUND

Articles prepared by using polymers such as polyethylene, polypropylene and polybutylene have advantages over articles prepared by using glass, metal and wood, as they are lighter in weight, rust free, easily moldable and reusable. However, creep rupture (slow crack growth) and environmental stress cracking in the polymers result in brittle breaks and macroscopic cracks in the articles without any visible warning.

Several attempts were made in the past to reduce creep rupture and improve the environmental stress crack resistant properties of polymers by tailoring molecular weight, molecular weight distribution (Mw/Mn) and melt processability of polymers. It is observed that the mixing of ultra-high molecular weight polyethylene with relatively low molecular weight polymer improves environmental stress crack resistant property of the resultant polymer composition.

For instance, WO1994028064 discloses polyethylene compositions comprising polyethylene and ultrahigh molecular weight polyethylene (0.1 to 40%). Ultrahigh molecular weight polyethylene (UHMWPE) used in accordance with WO1994028064 is characterized by molecular weight greater than $1.5 \times 10^6$, meting point of about 133.5° C. and bulk density of about 0.93 g/cm$^3$. These characteristics of UHMWPE indicate that the WO1994028064 employs regular ultrahigh molecular weight polyethylene (Regular UHMWPE).

Further, CN102167860 discloses a process for preparing a self-reinforced polyethylene blend. The process involves use of xylene to dissolve 1 to 3 parts of ultrahigh molecular weight polyethylene (UHMWPE) with 100 parts of high-density polyethylene (HDPE). A homogenous solution of UHMWPE and HDPE so obtained is then precipitated and dried to obtain UHMWPE/HDPE precipitate.

Still further, US20120004358 discloses compositions comprising intimate blends of ultrahigh molecular weight polyethylene and high-density polyethylene (HDPE). The amount of UHMWPE in the blend is in the range of 50 to 90%.

Known prior art prefer polymer compositions containing regular ultrahigh molecular weight polyethylene (Regular UHMWPE) and high density polyethylene. However, such compositions are associated with drawbacks such as the use of high amounts of regular UHMWPE. Secondly, the use of regular UHMWPE leads to non-homogeneous mixing of regular UHMWPE in the polyethylene matrix.

Accordingly, there is a need for a polymer composition having homogenous dispersion of polymers. Further there is also need for a polymer composition having better physical properties such as creep resistance, environmental stress crack resistance, stress bearing capability, stiffness and ductility.

OBJECTS

Some of the objects of the present disclosure are described herein below:

It is an object of the present disclosure to provide a polymer composition which has superior properties such as creep resistance, environmental stress crack resistance, stress bearing capability, stiffness and ductility in comparison to individual component of the composition.

It is another object of the present disclosure to provide a polymer composition which is ductile.

It is a further object of the present disclosure to provide a simple and economic process for preparing a polymer composition which has superior properties such as creep resistance, environmental stress crack resistance, stress bearing capability, stiffness and ductility in comparison to the individual components of the composition.

It is a still further object of the present disclosure to provide an article having improved creep resistance, environmental stress crack resistance, stress bearing capability, stiffness and ductility.

SUMMARY

In accordance with one aspect of the present disclosure there is provided a polymer composition comprising:
a. a first polymer; and
b. a second polymer having molecular weight higher than the molecular weight of the first polymer and heat of fusion greater than 200 J/g.

Typically, said polymer composition is characterized by increase in stress bearing capability with respect to the first polymer by 5 to 800%.

Typically, the first polymer is at least one selected from the group consisting of ethylene based homopolymer and ethylene based copolymer.

Typically, the second polymer is characterized by molecular weight in the range of $3 \times 10^5$ g/mole to $20 \times 10^6$ g/mole and bulk density less than 0.3 g/cc.

Typically, the second polymer is a disentangled ultra-high molecular weight polyethylene.

Typically, the amount Of second polymer ranges between 5 ppm and 200000 ppm.

Typically, the second polymer is characterized by:
a. molecular weight distribution in the range of 1.2 to 15;
b. relative viscosity in the range of 3.4 to 61 dl/g;
c. bulk density in the range of 0.045 to 0.30 g/cc; preferably, 0.048 to 0.10 g/cc;
d. melting point in the range of 139° C. to 147° C.; and
e. crystallization temperature (Tc) of 117° C. to 125° C.

Typically, a preform obtained from the composition of the present disclosure is in the form selected from the group consisting of chips, flakes, granules, powder, filaments and sheets.

Typically, an article prepared from the composition of the present disclosure includes but is not limited to fiber, yarn, film, pipe, tape and film.

In accordance with another aspect of the present disclosure there is provided a process for the preparation of a polymer composition comprising melt kneading of a first polymer with a second polymer having heat of fusion greater than 200 J/g to obtain a polymer composition; wherein,
a. the amount of the second polymer ranges between 5 ppm and 200000 ppm with respect to the total mass of the polymer composition, and
b. said polymer composition is characterized by increase in stress bearing capability with respect to the first polymer by 5 to 800%.

Typically, the step of melt kneading comprises mixing of the first polymer with the second polymer to obtain a mixture, followed by melting the mixture at a temperature of 130° C. to 300° C. under constant kneading for a time period of 10 to 30 minutes to obtain a polymer composition.

Typically, the step of melt kneading comprises melting the first polymer at a temperature of 130° C. to 300° C. at a speed of 10 to 30 rpm to obtain a molten polymer, followed by mixing the molten polymer with the second polymer for a time period of 10 to 30 minutes to obtain a polymer composition.

Typically, the first polymer is at least one selected from the group consisting of ethylene based homopolymer and ethylene based copolymer.

Typically, the second polymer is characterized by molecular weight in the range of $3 \times 10^5$ g/mole to $20 \times 10^6$ g/mole and bulk density less than 0.3 g/cc.

Typically, the second polymer is a disentangled ultra-high molecular weight polyethylene.

BRIEF DESCRIPTION OF THE ACCOMPANYING DRAWINGS

Figure 2:
Figure 2:
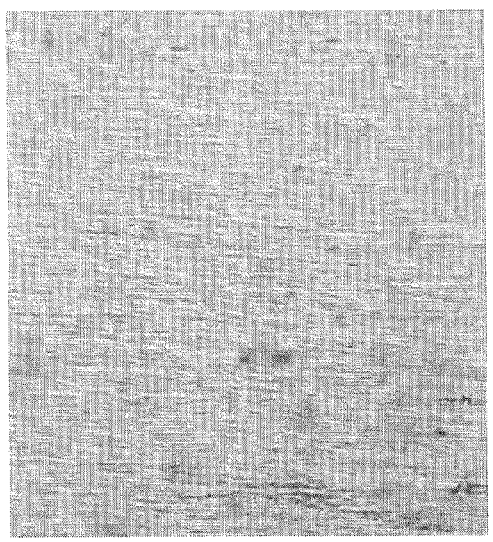
Figure 2:
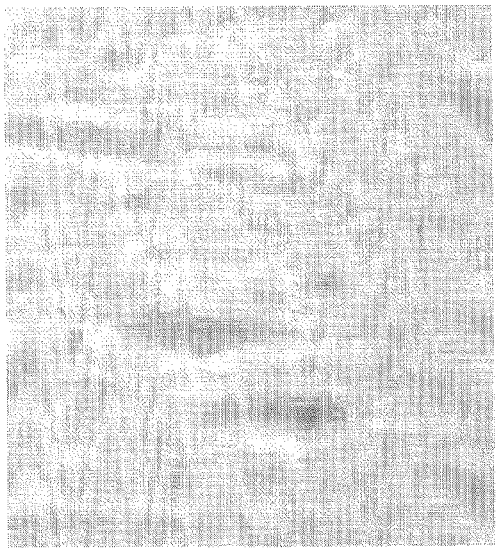
Figure 3:
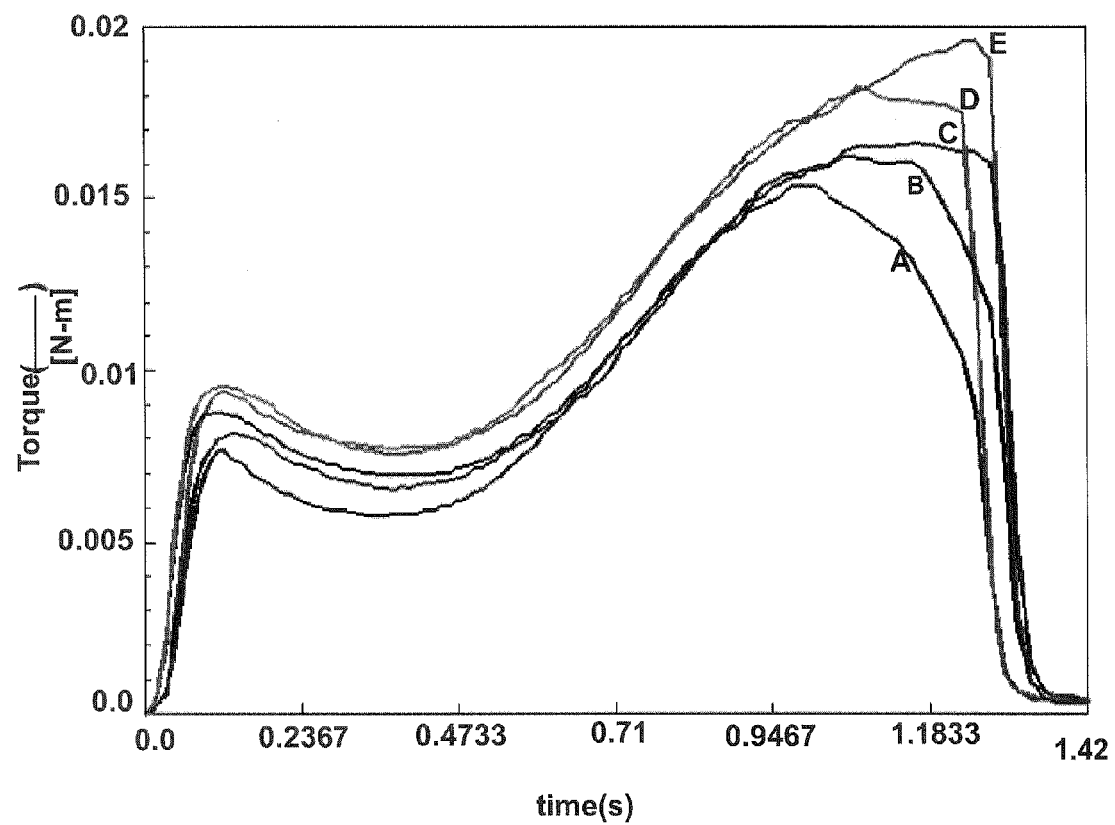
Figure 4:
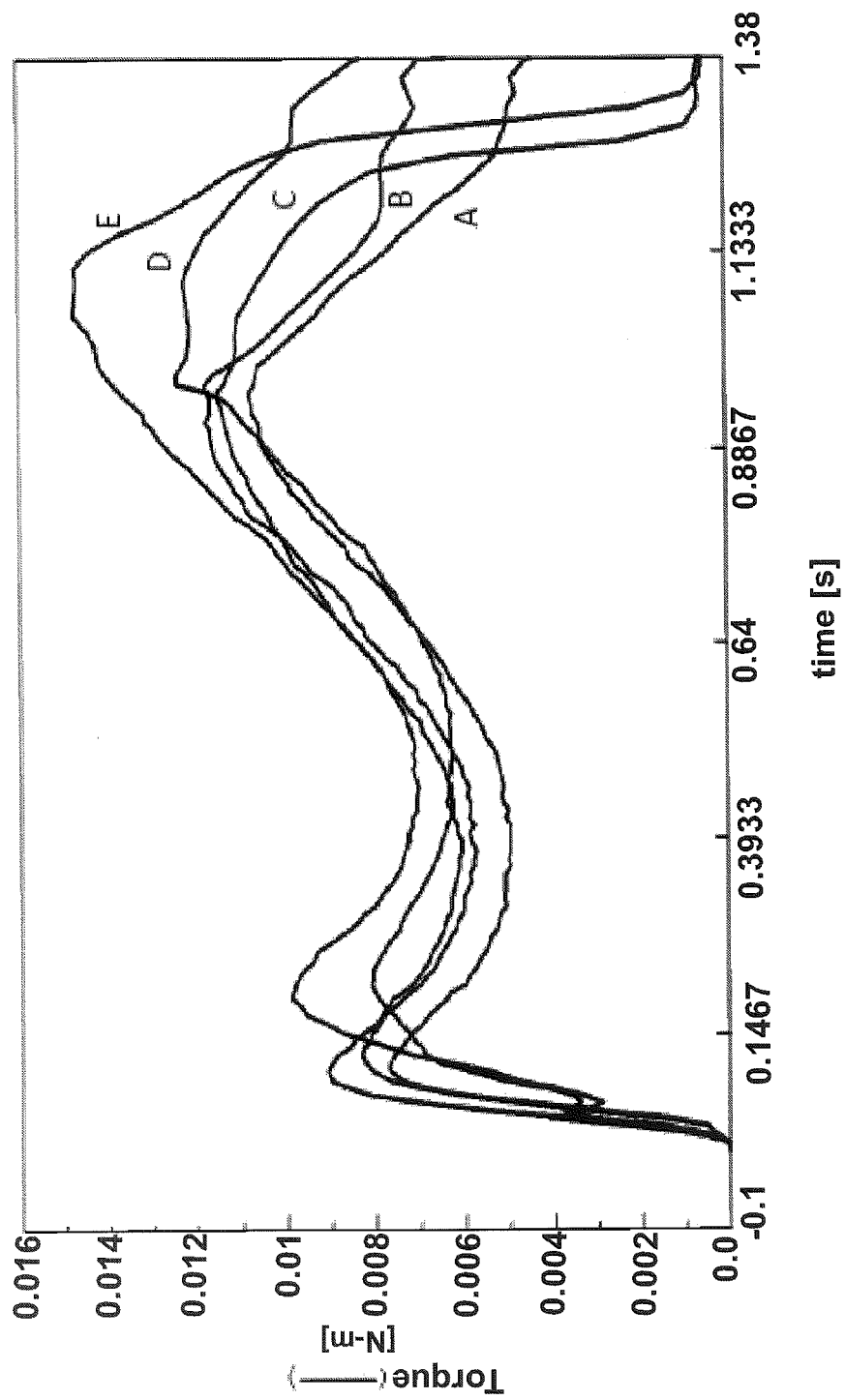
Figure 5:
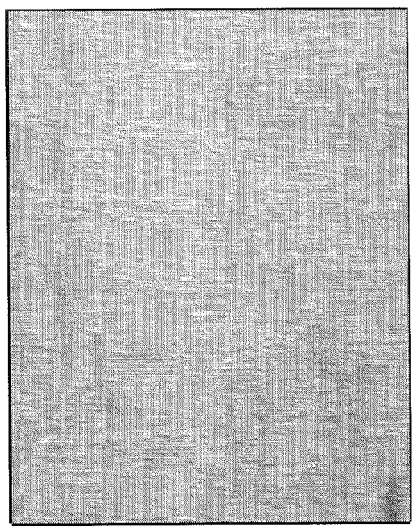
Figure 5:
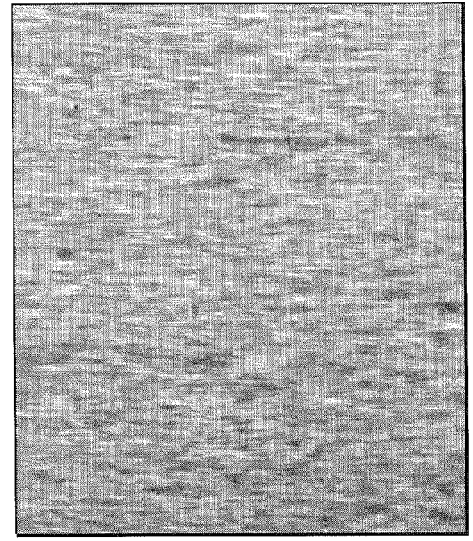
Figure 5:
Figure 6:
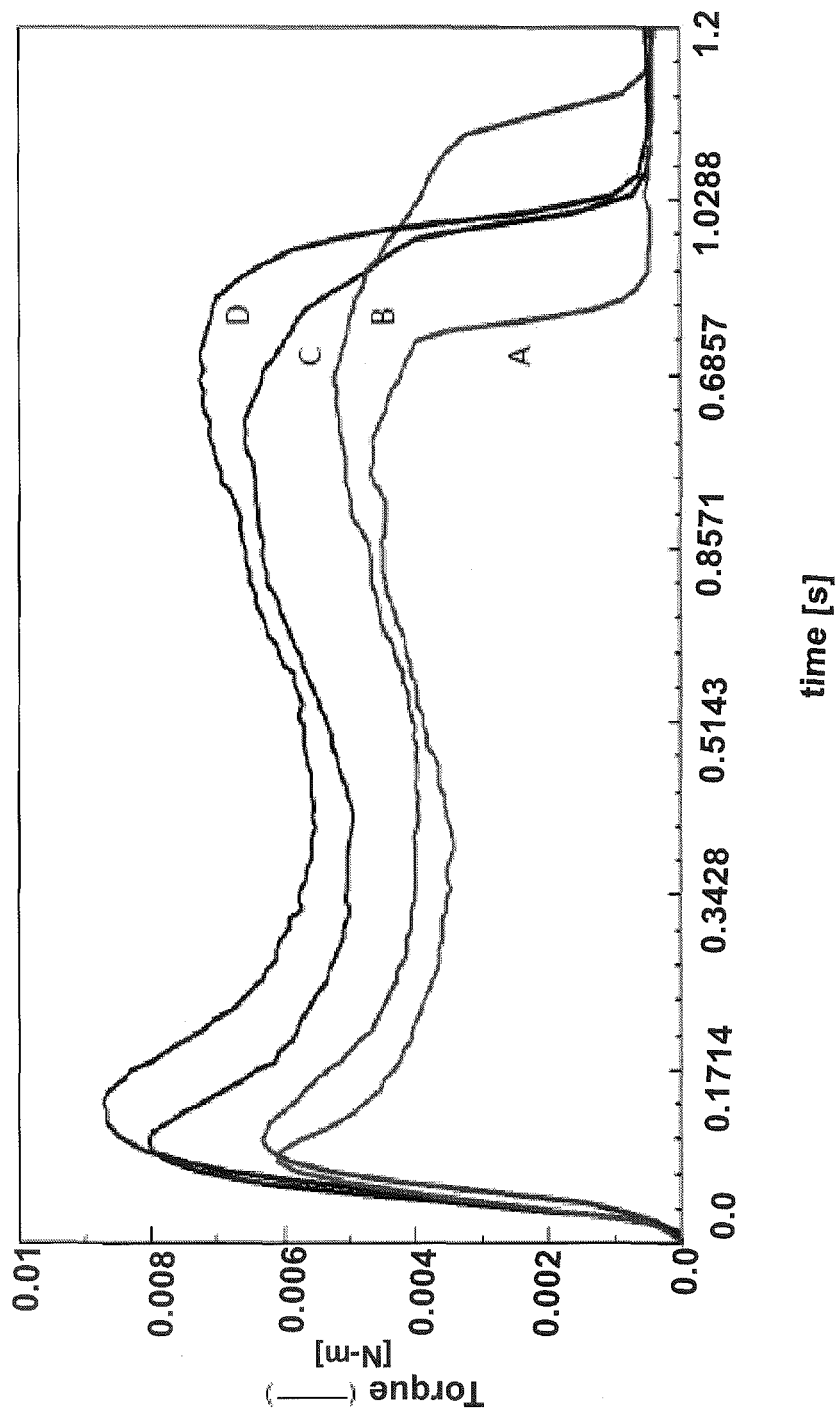
Figure 7:
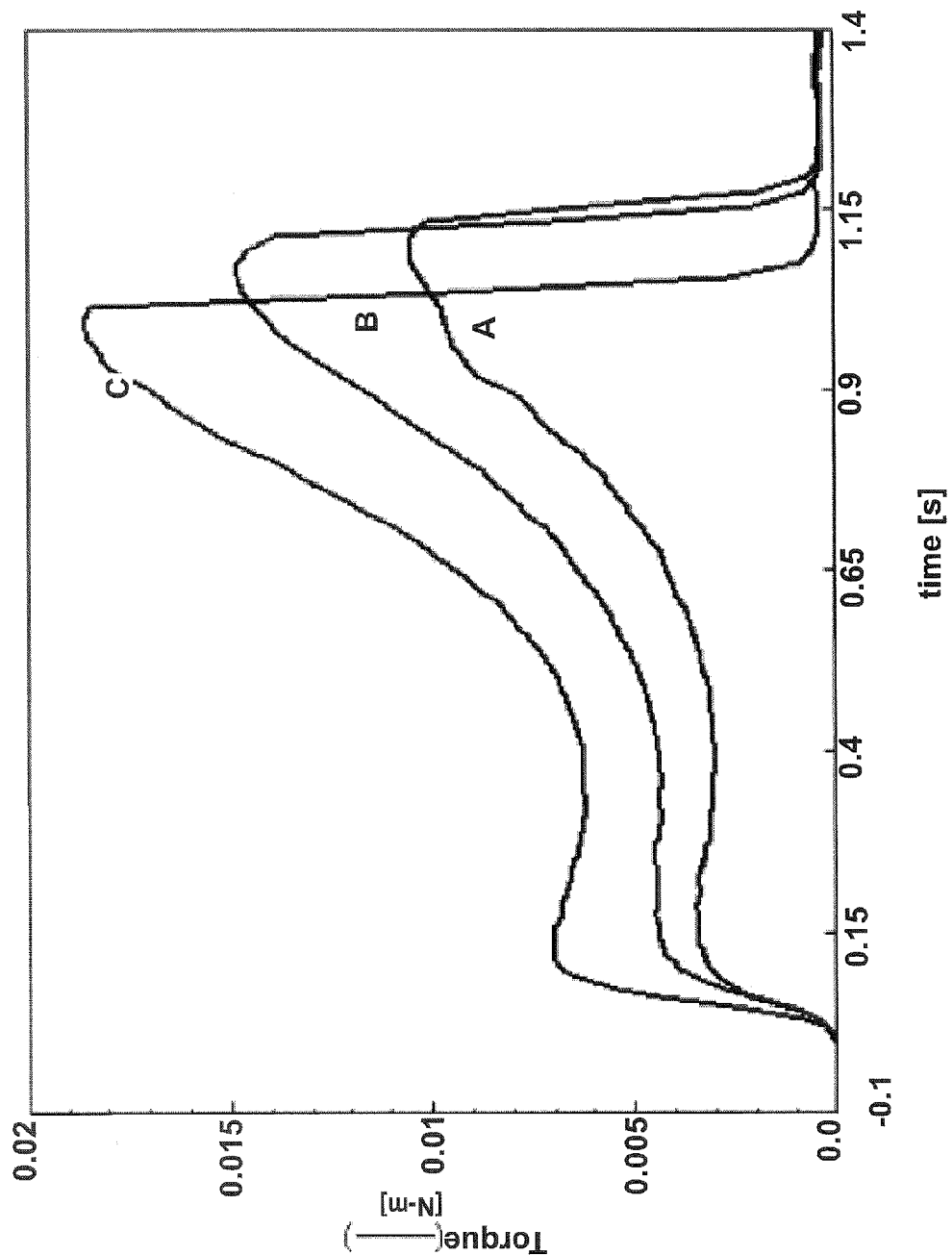

FIG. 1: illustrates torque values for HD-1 polymer compositions, wherein A represents a polymer (HD-1) having melt index 0.3 dg/min (5.0 kg/190° C.), density: 0.946 g/cc, butene-1 content—not less than 2.0 mole %, B represents a polymer composition containing HD-1 and 500 ppm of DUHMWPE, C represents a polymer composition containing HD-1 and 1000 ppm of DUHMWPE, D represents a polymer composition containing HD-1 and 5000 ppm of DUHMWPE, E represents a polymer composition containing HD-1 and 20000 ppm of DUHMWPE, F represents a polymer composition containing HD-1 and 50000 ppm of DUHMWPE, G represents a polymer composition containing HD-1 and 1000000 ppm of DUHMWPE and H represents a polymer composition containing HD-1 and 1000 ppm of regular UHMWPE;

FIG. 2: illustrates the polarizing microscopic (POM) images (100×), wherein (a) represents a polymer (HD-1), (b) represents a polymer composition containing HD-1 and 10000 ppm of DUHMWPE and (c) represents a polymer composition containing HD-1 and 10000 ppm of regular UHMWPE;

FIG. 3: illustrates torque values for HD-2 polymer compositions, wherein A represents a polymer (HD-2) having melt index 1.3 dg/min, density: 0.956 g/cc, butene content not less than 0.7 mole %, B represents a polymer composition containing HD-2 and 10000 ppm of regular UHMWPE, C represents a polymer composition containing HD-2 and 1000 ppm of DUHMWPE, D represents a polymer composition containing HD-2 and 5000 ppm of DUHMWPE and E represents a polymer composition containing HD-2 and 20000 ppm of DUHMWPE;

FIG. 4: illustrates torque values for HD-3 polymer compositions, wherein A represents a polymer (HD-3) having melt index 1 dg/min, density: 0.953 g/cc, B represents a polymer composition containing HD-3 and 1000 ppm of DUHMWPE, C represents a polymer composition containing HD-3 and 10000 ppm of regular UHMWPE, D represents a polymer composition containing HD-3 and 5000 ppm of DUHMWPE and E represents a polymer composition containing HD-3 and 20000 ppm of DUHMWPE;

FIG. 5: illustrates the polarizing microscopic (POM) images (100×) of HD-3 polymer composition, wherein (a) represents a polymer (HD-3), (b) represents a polymer composition containing HD-3 and 10000 ppm of DUHMWPE and (c) represents a polymer composition containing HD-3 and 10000 ppm of regular UHMWPE;

FIG. 6: illustrates torque values for HD-4 polymer compositions, wherein A represents a polymer (HD-4) having melt index 18 dg/min, density: 0.950 g/cc, B represents a polymer composition containing HD-4 and 10000 ppm of regular UHMWPE, C represents a polymer composition containing HD-4 and 10000 ppm of DUHMWPE and D represents a polymer composition containing HD-4 and 20000 ppm of DUHMWPE; and FIG. 7: illustrates torque values for the polymer compositions containing HD-1 and 5000 ppm of DUHMWPE having different molecular weight and bulk density, wherein A represents a polymer composition containing HD-1 with DUHMWPE of mol. wt $10.4 \times 10^6$ g/mole and bulk density 0.18 g/cc, B represents a polymer composition containing HD-1 and DUHMWPE having molecular weight $5 \times 10^6$ g/mole and bulk density 0.048 g/cc, C represents a polymer composition containing HD-1 and DUHMWPE having molecular weight $12 \times 10^6$ g/mole and bulk density 0.05 g/cc.

DETAILED DESCRIPTION

A polymer is a chain of small molecules joined together in a repeating fashion. In general, the physical properties of a polymer, such as stiffness, toughness, viscoelasticity and rigidity are directly proportional to the molecular chain length, molecular weight and molecular weight distribution of the polymer. However, melt processability of the polymer decreases as the molecular weight of the polymer increases, due to which processing of such high molecular weight polymers becomes exceedingly cumbersome. Further, the molecular weight and molecular weight distribution of the polymer also determine the physical and mechanical properties like environmental stress crack resistance, stress bearing capability, stiffness and ductility properties of articles prepared therefrom.

Therefore, various attempts were made in the past to improve the melt-processability of the polymer. Some of the prior art documents disclose the method of modifying the processability by using a polymer composition containing two or more polymers. It is further disclosed that polymer compositions containing regular ultra-high molecular weight polyethylene and polymers of relative low molecular weight can be utilized to overcome the melt processability problems. However, it is observed that the highly entangled polymer chains of regular UHMWPE forms stress concentration regions due to agglomeration of regular UHMWPE in the polymer composition which in turn leads to non-homogeneous mixing of regular UHMWPE with another polymer. Further, such polymer compositions fail to attain the desired physical properties such as stiffness, toughness, viscoelasticity, rigidity, creep rupture resistance and environmental stress crack resistance.

Therefore, in accordance with the present disclosure there is provided a polymer composition containing homogenous dispersion of a first polymer and a second polymer The second polymer used in accordance with the present disclosure has a molecular weight higher than the molecular weight of the first polymer and heat of fusion greater than 200 J/g The first polymer used in the polymer composition of the present disclosure includes but is not limited to ethylene based homopolymers and ethylene based copolymers.

Non limiting examples for the first polymer includes long chain branched polyethylene, copolymers of long chain branched polyethylene, linear polyethylene and copolymers of linear polyethylene, ultralow-density polyethylene (ULDPE), very low density polyethylene (VLDPE), low density polyethylene (LDPE), linear low density polyethylene (LLDPE), high density (HDPE) polyethylene, high molecular weight high density polyethylene (HMHDPE) having molecular weight distribution as unimodal or multimodal and combinations thereof.

The second polymer is characterized by molecular weight in the range of $3 \times 10^5$ g/mole to $20 \times 10^6$ g/mole and bulk density less than 0.3 g/cc. In accordance with the one of the embodiments of the present disclosure the second polymer is disentangled ultrahigh molecular weight polyethylene (DUHMWPE).

It is found that the polymer chains of the second polymer get homogenously dispersed in the first polymer which enhances the tie chain concentrations in the polymer composition.

The second polymer also improves the melt strength properties of the polymer composition without affecting the melt flowability of the first polymer. Articles made from the polymer composition of the present disclosure exhibit improved performance when processed by blow molding, blown film extrusion, extrusion coating, pipe extrusion, thermoforming etc. during molding and end-uses.

The amount of the second polymer used in the polymer composition of the present disclosure ranges between 5 ppm to 2000000 ppm and is characterized by molecular weight in the range of $3 \times 10^5$ g/mole to $20 \times 10^6$ g/mole; molecular weight distribution in the range of 1.2 to 15; relative viscosity in the range of 3.4 to 61 dl/g; bulk density in the range of 0.045 to 0.30 g/cc; melting point in the range of 139 to 147° C.; and crystallization temperature (Tc) in the range of 117 to 125° C.

In accordance with one embodiment of the present disclosure the second polymer has bulk density ranging between 0.048 to 0.10 g/cc.

The polymer composition of the present disclosure is characterized by increase in stress bearing capability with respect to the first polymer by 5 to 800%.

The polymer composition prepared in accordance with the present disclosure is in the form of a preform which includes but is not limited to chips, flakes, granules, powder, filaments and sheets. An article prepared from the composition of the present disclosure includes but is not limited to fiber, yarn, film, pipe, tape and film.

In accordance with the present disclosure there is also provided a process for the preparation of a polymer composition. The process includes melt mixing of a first polymer and a second polymer to obtain a polymer composition.

The first polymer used in the polymer composition of the present disclosure includes but is not limited to ethylene based homopolymers and ethylene based copolymers.

Non limiting examples of the first polymer includes long chain branched polyethylene, copolymers of long chain branched polyethylene, linear polyethylene and copolymers of linear polyethylene, ultralow-density polyethylene (ULDPE), very low density polyethylene (VLDPE), low density polyethylene (LDPE), linear low density polyethylene (LLDPE), high density (HDPE) polyethylene, high molecular weight high density polyethylene (HMHDPE) having molecular weight distribution as unimodal or multimodal and combinations thereof.

The second polymer is characterized by molecular weight in the range of $3 \times 10^5$ g/mole to $20 \times 10^6$ g/mole, heat of fusion greater than 200 J/g and bulk density less than 0.3 g/cc. In accordance with one embodiment of the present disclosure the second polymer is disentangled ultrahigh molecular weight polyethylene (DUHMWPE).

The amount of the second polymer used for preparing the composition ranges between 5 ppm and 200000 ppm with respect to the total mass of the polymer composition.

The polymer composition of the present disclosure is characterized by increase in stress bearing capability with respect to the first polymer by 5 to 800%.

The method step of melt kneading may be carried out by first mixing the second polymer with the first polymer to obtain a mixture and then melting the mixture at a temperature of 130° C. to 300° C. under constant kneading for a time period of 10 to 30 minutes to obtain a polymer composition.

The method step of melt kneading also carried out by melting the first polymer at a temperature of 130° C. to 300° C. at a speed of 10 to 30 rpm to obtain a molten polymer, followed by mixing the molten polymer with the second polymer for a time period of 10 to 30 minutes to obtain a polymer composition.

The polymer composition of the present disclosure has extensive end use applications for preparing blow molded articles, packaging films, injection molded articles, pipes and the like.

Hereinafter, the present disclosure will be described in more detail with reference to the following examples, but the scope of the present disclosure is not limited thereto.

EXAMPLE 1

37 gm of ethylene polymer (HD-1) having melt index 0.3 dg/min (5.0 kg/190° C.), density: 0.946 g/cc, butene content—not less than 2.0 mole % (bimodal), containing stabilizers—Inganox 1010 (1500 ppm) and Irgaphos 168 (1500 ppm) was loaded in a twin blades batch mixer set at a temperature of 175° C. and 20 rpm. A 5 kg dead weight was kept to facilitate homogenization. On complete melting of HD-1, DUHMWPE having molecular weight (MW) $5 \times 10^6$ and bulk density 0.0486 g/cc was poured on to the molten polymer and then kneaded for 20 min to obtain polymer composition. DUHMWPE was used in an amount of 500 ppm, 1000 ppm, 5000 ppm, 20000 ppm, 50000 ppm and 1000000 ppm in respective compositions.

Similarly, polymer compositions containing 10000 ppm of regular UHMWPE (intrinsic viscosity: 21 dl/g, molecular weight: 3.7 million, Bulk density: 0.4 g/cc) were also prepared under similar set of conditions.

The polymer compositions so obtained were then compression molded in the form of thin sheet of 10 cm×10 cm and 0.5 mm thickness at 350 bar pressure in stepped fashion starting from 50 bar and temperature of 150° C.

The extensional stress-strain behavior of the polymer compositions was obtained using SER-HV-A01 Universal Testing Platform of M/s Xpansion Instruments, USA hooked to RDA-III (M/s TA Instruments). The test was performed at a temperature of 125° C. using thin sheet sample (stress built up measured as torque).

The results given in FIG. 1 and table 1, indicate that torque of HD-1 increases with the melt homogenization of DUHMWPE. Torque of HD-1 increased up to 335.3% using 5000 ppm of DUHMWPE. Contrary to this, the composition containing 10000 ppm of regular UHMWPE has shown only 32% increase in torque. This confirms the effective role of polymer chains of DUHMWPE as tie chain enhancer which further increases stress bearing capability of the composition.

TABLE 1

Percent change in torque of HD-1 using DUHMWPE and regular UHMWPE

| Concentration of DUHMWPE in PPM | Maximum Torque Nm at 125° C. | Change in Torque (%) |
|---|---|---|
| Nil | 0.0034 | — |
| 500 | 0.0111 | 226.5 |
| 1000 | 0.0109 | 220.6 |
| 5000 | 0.0148 | 335.3 |
| 20000 | 0.0166 | 388.2 |
| 50000 | 0.0233 | 585.3 |
| 100000 | 0.0280 | 723.5 |
| 10000 (regular UHMWPE) | 0.0045 | 32.4 |

The polarizing microscopic images (magnification: 100×) also confirm the homogeneity of DUHMWPE with HD-1 whereas regular UHMWPE found dispersed in non-homogenized state (FIG. 2).

EXAMPLE 2

Powder of linear polyethylene having melt index (MI) 1.3 dg/min (5.0 kg/190° C., bimodal), density: 0.956 g/cc, butene content: 0.7 mole % (hereafter referred as HD-2) was melt kneaded with DUHMWPE powder having molecular weight 5 million and bulk density 0.0486 g/cc to obtain a polymer composition. The composition was then compression molded in the form of thin sheets under the conditions as described in the example 1.

The extensional stress-strain behavior of the compositions was measured as per the parameters given in the example 1 and results are given in FIG. 3 and table 2. The slope of initial linear portion of the plot, yield point and torque of HD-2 increases with the melt homogenization of DUHMWPE. The maximum torque increased up to 16.3% using 5000 ppm of DUHMWPE. Contrary to this, the composition containing 10000 ppm of regular UHMWPE has shown about 6% increase in torque.

TABLE 2

Percent change in torque of HD-2 using DUHMWPE and regular UHMWPE

| Concentration of DUHMWPE in ppm | Maximum Torque, Nm at 125° C. | Change in Torque (%) |
|---|---|---|
| NIL | 0.0153 | |
| 1000 | 0.0166 | 8.4 |
| 5000 | 0.0178 | 16.3 |
| 20000 | 0.0196 | 28.1 |
| 10000 (regular UHMWPE) | 0.0162 | 5.9 |

EXAMPLE 3

Powder of linear polyethylene having melt index (MI): 1.0 dg/min (2.16 kg/190° C.), density: 0.953 g/cc (hereafter referred as HD-3) was melt kneaded with DUHMWPE powder having molecular weight 5 million and bulk density 0.0486 g/cc and the mixed mass (polymer composition) was then compression molded in the form of thin sheet under the conditions as detailed in the example 1.

The extensional stress-strain behavior of the polymer compositions was measured at a temperature of 128° C., rest other parameters are as per the example 1 and results are given in FIG. 4 and table 3. The increase in torque of composition was found to be 14% with 5000 ppm of DUHMWPE. Contrary to this, polymer composition containing 10000 ppm of regular UHMWPE has shown about 6.5% in increase in torque. The polarizing microscopic images also confirm the homogeneity of DUHMWPE with HD-3 (FIG. 5).

TABLE 3

Percent change in torque of HD-3
using DUHMWPE and regular UHMWPE

| Concentration of DUHMWPE in ppm | Maximum Torque, Nm at 128° C. | Change in Torque (%) |
| --- | --- | --- |
| Nil | 0.0107 | 0 |
| 1000 | 0.0118 | 10.2 |
| 5000 | 0.0122 | 14.0 |
| 20000 | 0.0148 | 38.3 |
| 10000 (regular UHMWPE) | 0.0114 | 6.5 |

EXAMPLE 4

Powder of linear polyethylene having melt index (MI): 18 dg/min (2.16 kg/190° C.), density: 0.950 g/cc (hereafter referred as HD-4) was melt kneaded with DUHMWPE powder of MW 5 million and bulk density 0.0486 g/cc and the mixed mass (polymer composition) was then compression molded in the form of sheet under the conditions as detailed in the example 1.

The extensional stress-strain behavior of the polymer compositions was measured at a temperature of 123° C., rest other parameters are same as that of the example 1 and results given in FIG. 6 and table 4. The torque of HD 4 polymer has increased up to 27% with the addition of 10000 ppm of DUHMWPE. Contrary to this the composition containing 10000 ppm of regular UHMWPE has shown a drop in torque of about 6%.

TABLE 4

Percent change in torque of HD-4
using DUHMWPE and regular UHMWPE

| Concentration of UHMWPE, ppm | Maximum Torque, Nm at 123° C. | Change in Torque (%) |
| --- | --- | --- |
| HD-4 | 0.0063 | — |
| 10000 | 0.0080 | 27 |
| 20000 | 0.0087 | 38 |
| 10000 (regular UHMWPE) | 0.0059 | (—) 6 |

EXAMPLE 5

The compositions of HD-1 with DUHMWPE (5000 PPM) having molecular weight $5.0 \times 10^6$, $10.4 \times 10^6$ and $12 \times 10^6$ g/mol and bulk density 0.048, 0.18 and 0.05 g/cc respectively, were prepared as per the process given in the example 1.

The extensional stress-strain behavior of the composition was measured as per the parameters given in the example 1 and results are given in FIG. 7 and table 5. The slope of initial linear portion of the plot, yield point and maximum torque value increases with the increase of molecular weight of DUHMWPE with bulk density 0.048 and 0.05 g/cc.

TABLE 5

Percent change in torque of HD-1 using DUHMWPE
of different molecular weight and bulk density

| DUHMWPE | | | |
| --- | --- | --- | --- |
| Mol wt. $10^6$ (g/mol) | Bulk density (g/cc) | Maximum Torque Nm at 125° C. | Change in Torque (%) |
| NIL | — | 0.0034 | — |
| 5.0 | 0.048 | 0.0148 | 335 |
| 10.4 | 0.18 | 0.0106 | 212 |
| 12 | 0.05 | 0.0186 | 447 |

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "a", "at least" or "at least one" suggests the use of one or more elements or ingredients or quantities, as the use may be in the embodiment of the disclosure to achieve one or more of the desired objects or results.

The numerical values given for various physical parameters, dimensions and quantities are only approximate values and it is envisaged that the values higher or lower than the numerical value assigned to the physical parameters, dimensions and quantities fall within the scope of the disclosure and the claims unless there is a statement in the specification to the contrary.

While certain embodiments of the disclosure have been described, these embodiments have been presented by way of examples only, and are not intended to limit the scope of the disclosure. Variations or modifications in the process of this disclosure, within the scope of the disclosure, may occur to those skilled in the art upon reviewing the disclosure herein. Such variations or modifications are well within the spirit of this disclosure.

The invention claimed is:

1. A polymer composition comprising:
   a. a first polymer, wherein the first polymer is an ethylene based homopolymer or an ethylene based copolymer, the homopolymer or copolymer selected from the group consisting of long chain branched polyethylene, copolymers of long chain branched polyethylene, linear polyethylene, ultralow-density polyethylene (ULDPE), very low density polyethylene (VLDPE), low density polyethylene (LDPE), linear low density polyethylene (LLDPE), high density (HDPE) polyethylene, and high molecular weight high density polyethylene (HMH-DPE); and
   b. a second polymer having a heat of fusion greater than 200 J/g, wherein the second polymer is a disentangled ultra-high molecular weight polyethylene characterized by a bulk density less than 0.3 g/cc.

2. The polymer composition as claimed in claim 1, wherein, said polymer composition is characterized by increase in stress bearing capability with respect to the first polymer by 5 to 800%.

3. The polymer composition as claimed in claim 1, wherein the amount of second polymer ranges between 5 ppm and 200000 ppm.

4. The polymer composition as claimed in claim 1, wherein the second polymer is characterized by:
   a. molecular weight distribution in the range of 1.2 to 15;
   b. bulk density in the range of 0.045 to 0.30 g/cc;
   c. melting point in the range of 139° C. to 147° C.; and
   d. crystallization temperature (Tc) of 117° C. to 125° C.

5. A preform obtained from the composition as claimed in claim 1, wherein said preform is selected from the group consisting of chips, flakes, granules, powder, filaments and sheets.

6. An article prepared from the composition as claimed in claim 1, wherein said article is selected from the group consisting of fiber, yarn, pipe, tape and film.

7. A process for the preparation of a polymer composition comprises melt kneading of a first polymer with a second polymer having heat of fusion greater than 200 J/g to obtain a polymer composition;
wherein the first polymer is an ethylene based homopolymer or an ethylene based copolymer, the homopolymer or copolymer selected from the group consisting of long chain branched polyethylene, copolymers of long chain branched polyethylene, linear polyethylene, ultralow-density polyethylene (ULDPE), very low density polyethylene (VLDPE), low density polyethylene (LDPE), linear low density polyethylene (LLDPE), high density (HDPE) polyethylene, and high molecular weight high density polyethylene (HMHDPE); and
wherein the second polymer is a disentangled ultra-high molecular weight polyethylene characterized by a bulk density less than 0.3 g/cc, wherein:
a. the amount of the second polymer ranges between 5 ppm and 200000 ppm with respect to the total mass of the polymer composition, and
b. said polymer composition is characterized by increase in stress bearing capability with respect to the first polymer by 5 to 800%.

8. The process as claimed in claim 7, wherein the step of melt kneading comprises mixing of the first polymer with the second polymer to obtain a mixture, followed by melting the mixture at a temperature of 130° C. to 300° C. under constant kneading for a time period of 10 to 30 minutes to obtain a polymer composition.

9. The process as claimed in claim 7, wherein the step of melt kneading comprises melting the first polymer at a temperature of 130° C. to 300° C. at a speed of 10 to 30 rpm to obtain a molten polymer, followed by mixing the molten polymer with the second polymer for a time period of 10 to 30 minutes to obtain a polymer composition.

10. A polymer composition comprising:
a. a first polymer, wherein the first polymer is an ethylene based homopolymer or an ethylene based copolymer, the homopolymer or copolymer selected from the group consisting of long chain branched polyethylene, copolymers of long chain branched polyethylene, linear polyethylene, ultralow-density polyethylene (ULDPE), very low density polyethylene (VLDPE), low density polyethylene (LDPE), linear low density polyethylene (LLDPE), high density (HDPE) polyethylene, and high molecular weight high density polyethylene (HMHDPE); and
b. a second polymer having a heat of fusion greater than 200 J/g, wherein the second polymer is a disentangled ultra-high molecular weight polyethylene, characterized by:
i. molecular weight distribution in the range of 1.2 to 15;
ii. bulk density in the range of 0.045 to 0.30 g/cc;
iii. melting point in the range of 139° C. to 147° C.; and
iv. crystallization temperature (Tc) of 117° C. to 125° C.

11. The polymer composition as claimed in claim 10, wherein, said polymer composition is characterized by increase in stress bearing capability with respect to the first polymer by 5 to 800%.

12. The polymer composition as claimed in claim 10, wherein the amount of second polymer ranges between 5 ppm and 200000 ppm.

13. The polymer composition as claimed in claim 10, wherein the second polymer has a bulk density in the range of 0.048 to 0.10 g/cc.

14. The polymer composition as claimed in claim 1, wherein the second polymer has a bulk density in the range of 0.048 to 0.10 g/cc.

* * * * *